(12) United States Patent
Wehby

(10) Patent No.: US 12,516,513 B2
(45) Date of Patent: Jan. 6, 2026

(54) BODY WASTE CLEANING SYSTEM

(71) Applicant: Mark Wehby, Lebanon, TN (US)

(72) Inventor: Mark Wehby, Lebanon, TN (US)

(73) Assignee: Mark Wehby, Lebanon, TN (US)

( * ) Notice: Subject to any disclaimer, the term of this patent is extended or adjusted under 35 U.S.C. 154(b) by 283 days.

(21) Appl. No.: 18/212,130

(22) Filed: Jun. 20, 2023

(65) Prior Publication Data

US 2023/0407614 A1 Dec. 21, 2023

Related U.S. Application Data

(60) Provisional application No. 63/353,316, filed on Jun. 17, 2022.

(51) Int. Cl.
*E03D 9/00* (2006.01)
*A61L 2/10* (2006.01)

(52) U.S. Cl.
CPC .............. *E03D 9/002* (2013.01); *A61L 2/10* (2013.01); *A61L 2202/14* (2013.01); *A61L 2202/25* (2013.01)

(58) Field of Classification Search
CPC ........ E03D 9/002; A61L 2/10; A61L 2202/14; A61L 2202/25
USPC .............................. 4/662, 420.1–420.4, 443
See application file for complete search history.

(56) References Cited

U.S. PATENT DOCUMENTS

| | | | | |
|---|---|---|---|---|
| 3,969,133 A | * | 7/1976 | McTighe | E03D 9/002 4/662 |
| 4,233,692 A | * | 11/1980 | Sinsley | E03D 9/002 4/662 |
| 2004/0181865 A1 | * | 9/2004 | Egeresi | E03D 9/005 4/420.4 |
| 2021/0369881 A1 | * | 12/2021 | Hayden | A61L 2/0023 |
| 2023/0211030 A1 | * | 7/2023 | Lloyd | A61L 2/10 422/28 |

* cited by examiner

*Primary Examiner* — Tuan N Nguyen
(74) *Attorney, Agent, or Firm* — Mark A. Pitchford; Eric B. Fugett; Pitchford Fugett, PLLC

(57) ABSTRACT

A body waste cleaning system including at least one controller and at least one storage reservoir. The storage reservoir is configured to contain an amount of at least one fluid substance therein. The body waste cleaning system further includes at least one blowing device coupled to the at least one controller. The blowing device configured to expose a target area to air movement when activated by the at least one controller. The body waste cleaning system further includes at least one dispensing mechanism coupled to the at least one controller and connected to the at least one storage reservoir. The at least one dispensing mechanism is configured to dispense a portion of the at least one fluid substance onto the target area when activated by the at least one controller.

14 Claims, 14 Drawing Sheets

BODY WASTE CLEANING SYSTEM

CROSS-REFERENCES TO RELATED APPLICATIONS

This application is a non-provisional application of and hereby claims priority to U.S. Provisional Patent Application No. 63/353,316 entitled "BODY WASTE CLEANING SYSTEM" filed on May 17, 2022.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to cleaning systems. More particularly, this invention pertains to cleaning systems configured to clean human or animal body waste.

Body waste excreted from humans and animals is unpleasant to look at, foul smelling, and may contain various types of viruses and bacteria that may pose health risks to those who may come in physical contact with it. Public restrooms are among the more notable locations where individuals may unintentionally be exposed to the waste from other humans, including fecal matter and urine. While the businesses that own public restrooms typically strive to keep them clean, it is not feasible to devote the time and money required to apply the amount of manual cleaning needed to ensure the restrooms remain clean and sanitary after every use or every few uses. The urinals and surrounding areas in men's rooms are especially prone to getting dirty as splatter, poor aim, and carelessness contribute to the buildup of urine on urinal exteriors, bathroom walls, and the bathroom floor. Urine buildup on the floor under and in front of a urinal is unpleasant for subsequent users to stand in, poses a potential slipping hazard, can damage flooring and grout, and may contain viruses and bacteria that may get spread around via the bottoms of the users' shoes. Manually cleaning the floor around a urinal with mops, sprays, and disinfectants is time consuming and inefficient, and requires a period of time during which the urinal must remain unused to allow any applied cleaning products to dry so people do not slip on them. Placing mats by the urinal only serves to cause urine to be absorbed therein and buildup further, causing odor and health risk problems to worsen.

BRIEF SUMMARY OF THE INVENTION

Aspects of the present invention provide a system for cleaning body waste, such as urine, that is configured to perform at least one of several possible cleaning functions. One or more cleaning functions may be grouped together to establish a variety of cleaning cycles. Potential cleaning functions may include, without limitation, dispensing an amount of cleaning, disinfecting, or sanitizing fluid to a target area, such as the floor around a urinal in a public restroom; causing an amount of air to be blown in the direction of a target area to remove moisture from the target area via evaporation at an accelerated rate; exposing a target area to an amount of ultraviolet (UV) light to produce an at least partially sanitizing effect at the target area; or any similar cleaning function(s) or combination thereof. One, multiple, or all utilized cleaning functions may be performed by the system in an at least partially autonomous fashion under the control of at least one computing device or similar controller. This eliminates the need for regular manual cleaning of the target area, such as the floor under and around a urinal, while still keeping the target area in a state of near constant cleanliness. The cleaning system may include at least one dispensing mechanism (e.g., a sprayer or nozzle) for dispensing the cleaning/disinfecting/sanitizing fluid, at least one UV light source for emitting UV light, and at least one blowing device, such as a fan with at least one vent, for facilitating air movement.

In one aspect, a body waste cleaning system including at least one controller and at least one storage reservoir. The storage reservoir is configured to contain an amount of at least one fluid substance therein. The body waste cleaning system further includes at least one blowing device coupled to the at least one controller. The at least one blowing device configured to expose a target area to air movement when activated by the at least one controller. The body waste cleaning system further includes at least one dispensing mechanism coupled to the at least one controller and connected to the at least one storage reservoir. The at least one dispensing mechanism is configured to dispense a portion of the at least one fluid substance onto the target area when activated by the at least one controller.

In another aspect, a body waste cleaning system includes at least one controller and at least one storage reservoir. The storage reservoir is configured to contain an amount of at least one fluid substance therein. The body waste cleaning system further includes at least one blowing device coupled to the at least one controller. The at least one blowing device is configured to expose a target area to air movement when activated by the at least one controller. The body waste cleaning system further includes at least one sensing device coupled to the at least one controller. The at least one sensing device is configured to sense a user location and a body waste location spilled by a user. The body waste cleaning system further includes at least one dispensing mechanism coupled to the at least one controller and connected to the at least one storage reservoir. The at least one dispensing mechanism is configured to dispense a portion of the at least one fluid substance onto the target area when activated by the at least one controller. The controller is configured to: obtain cleaning system data, location data, and usage data, generate a cleaning cycle based at least in part upon the cleaning system data, the location data, the usage data, the user location, and the body waste location, and generate a cleaning cycle adjustment to alter the cleaning cycle based at least in part upon the user location.

In another aspect, a method includes providing a body waste cleaning system including at least one controller, at least one storage reservoir, the storage reservoir is configured to contain an amount of at least one fluid substance therein, at least one blowing device coupled to the at least one controller, at least one sensing device coupled to the at least one controller, and at least one dispensing mechanism coupled to the at least one controller and connected to the at least one storage reservoir. The method further includes obtaining, by the at least one controller, cleaning system data, location data, and usage data and sensing, by the at least one sensing device, a user location and a body waste location spilled by a user. The method further includes generating, by the at least one controller, a cleaning cycle based at least in part upon the cleaning system data, the location data, the usage data, the user location, and the body waste location. The method further includes generating, by the at least one controller, a cleaning cycle adjustment to alter the cleaning cycle based at least in part upon the user location and dispensing, by the at least one dispensing mechanism, a portion of the at least one fluid substance onto a target area when activated by the at least one controller. The method further includes exposing, by the at least one blowing device, the target area to air movement when activated by the at least one controller to evaporate the dispensed portion of the at least one fluid substance.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
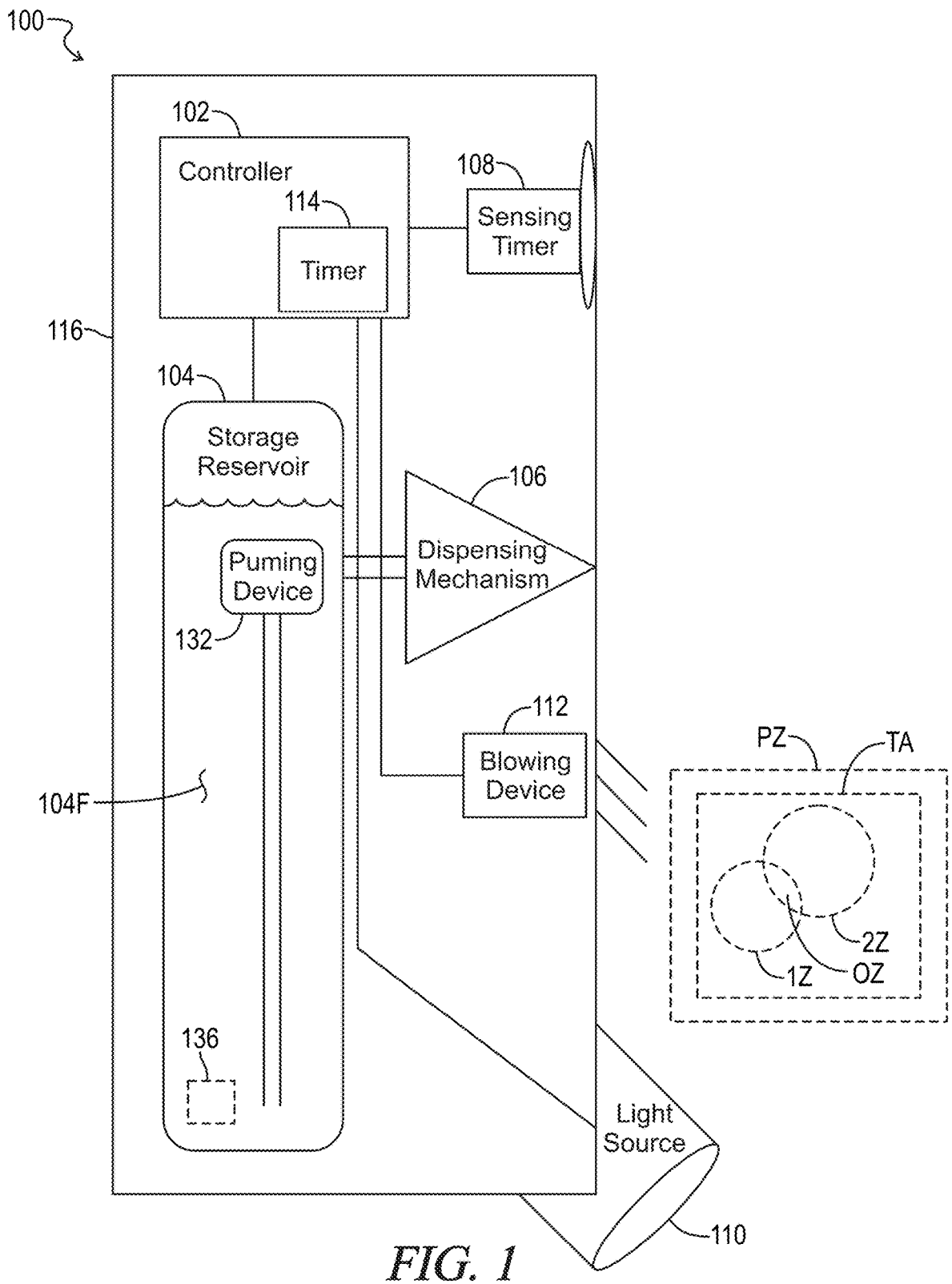
FIG. 1 is a schematic illustrating a cutaway side view of a body waste cleaning system according to one embodiment of the invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of system components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or system described and claimed herein unless otherwise specified. The terms "above", "below", "over", and "under" mean "having an elevation or vertical height greater or lesser than" and are not intended to imply that one object or component is directly over or under another object or component. As used herein, the upright orientation of the body waste cleaning system is mounted on a flat wall or similar surface with the bottom down, the top up, and front facing away from the mounting surface such that the cleaning system is ready for operation or may be in operation such as seen in, for example, FIGS. 4 and 5.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

The term "coupled" means at least either a direct electrical connection between the connected items or an indirect connection through one or more passive or active intermediary devices. As used herein, such a connection may be wireless such as when communicating between distinct devices within the system or to a central device that at least partially controls operation of individual cleaning devices.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

It will be understood by those of skill in the art that navigating between user interface views is accomplished by selecting a tab or object in a current user interface view corresponding to another user interface view, and in response to selecting the tab or object, the user interface updates with said another user interface view corresponding to the selected tab or object. Alternatively, a user interface and user interface views may include DIP switch arrays or a number of buttons with an LCD display or LED lights to indicate modes selected by the user via the DIP switches or button(s).

It will be understood by those of skill in the art that providing data to the system or the user interface may be accomplished by clicking (via a mouse or touchpad) on a particular object or area of an object displayed by the user interface, or by touching the displayed object in the case of a touchscreen implementation. This interface may be local to the device or on a remote centralized controller which subsequently communicates the input to the device.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

Referring to FIGS. 1-11, a body waste cleaning system 100 includes at least one controller 102, at least one storage reservoir 104 configured to contain an amount of at least one type of fluid (liquid or gaseous) substance 104F, and at least one dispensing mechanism 106 configured to dispense a portion of the fluid substance 104F, such as a nozzle or sprayer. The body waste cleaning system 100 can further include at least one sensing device 108, at least one light source 110, and/or at least one blowing device 112. In some embodiments, the body waste cleaning system 100 can further include a timer mechanism 114.

Figure 10:
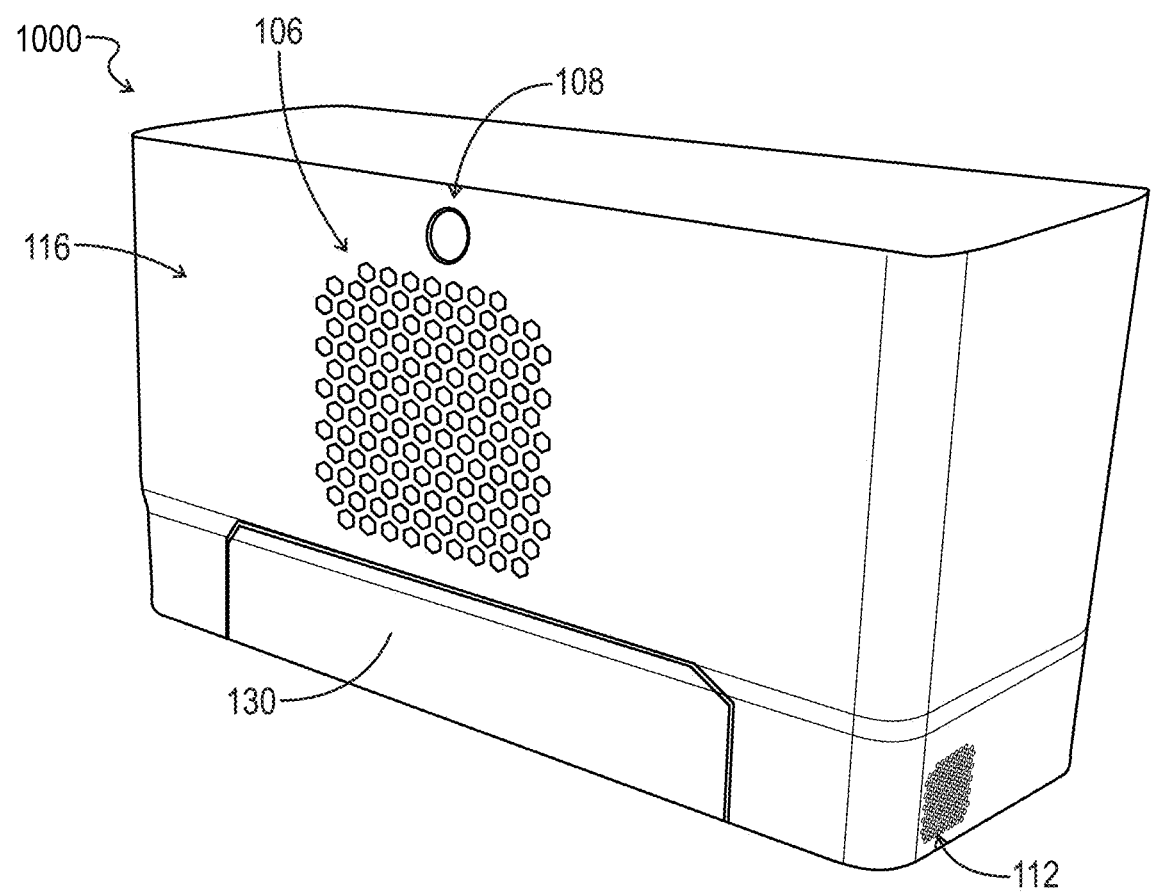
FIG. 10 is an elevated front perspective view of another exemplary embodiment of a body waste cleaning system. The body waste cleaning system including a sensor, a dispensing mechanism, and a blowing device.
Figure 11:
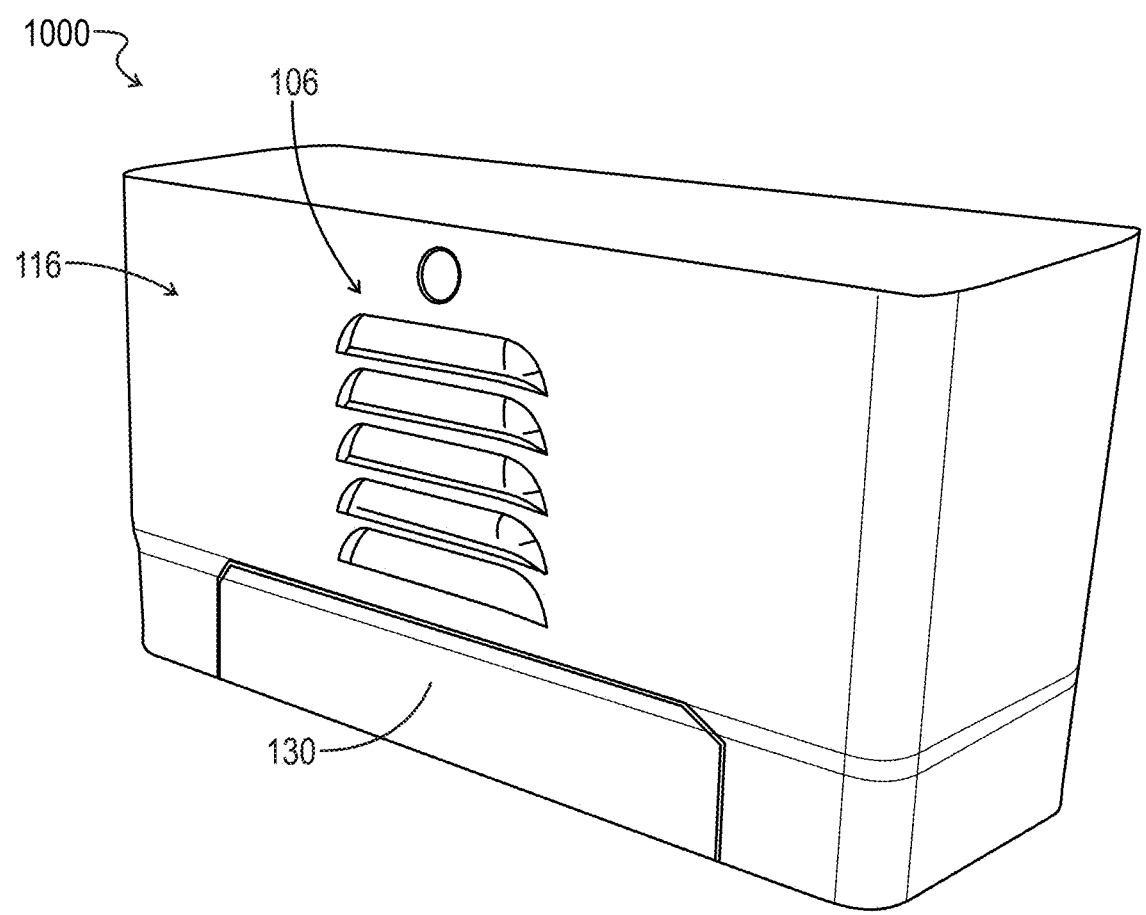
FIG. 11 is an elevated front perspective view of another exemplary embodiment of a body waste cleaning system. The body waste cleaning system includes a dispensing mechanism and/or a blowing device.

In some embodiments, the body waste cleaning system 1000, 1100 may not include a light source 110 or a sensing device 108 (FIGS. 10 and 11). The body waste cleaning system 1000 may include a sensing device 108, a dispensing mechanism 106, and a blowing device 112. The body waste cleaning system 1100 may include a dispensing mechanism 106 and/or a blowing device 112.

Figure 4:
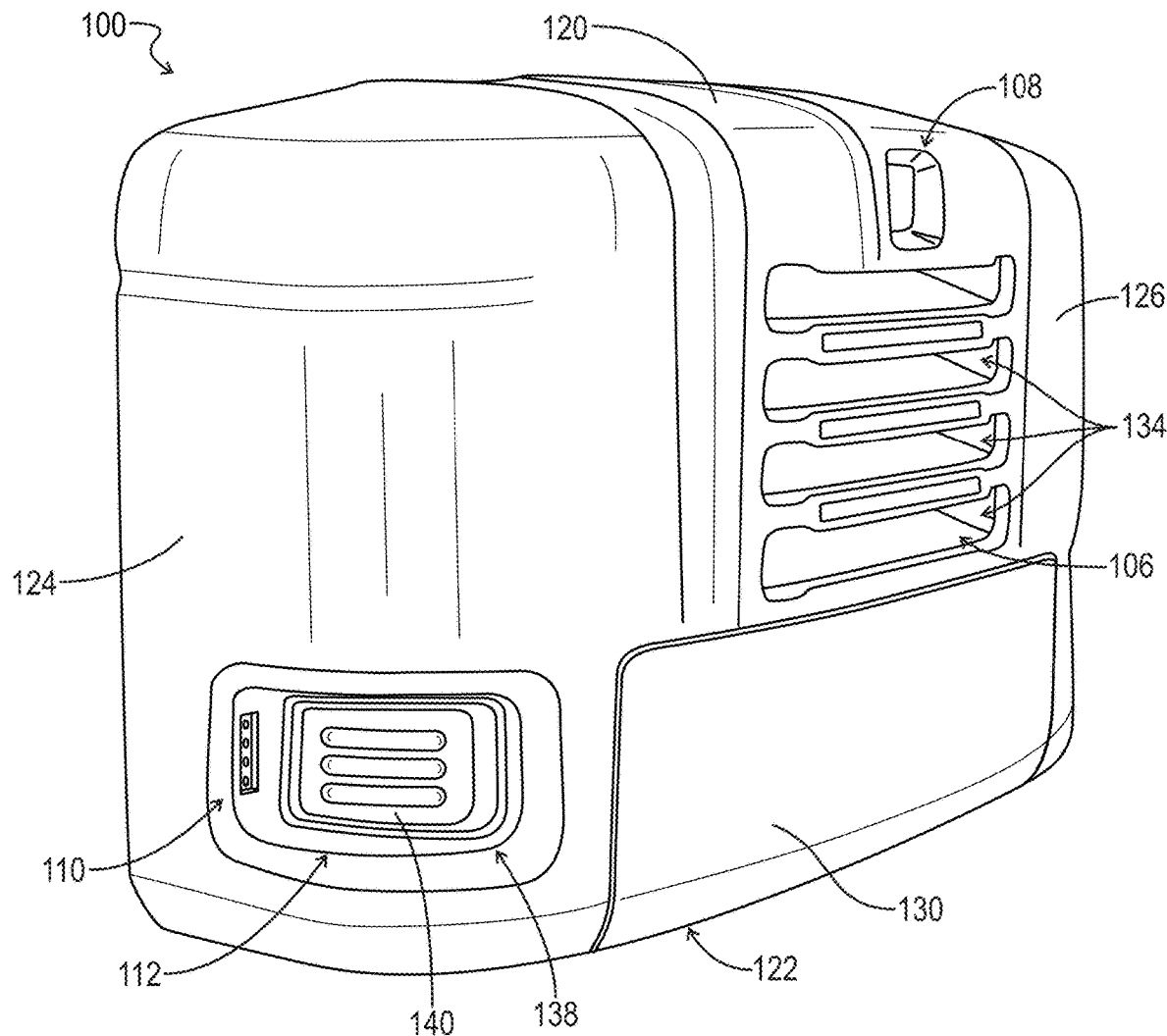
FIG. 4 is a left side perspective view of a body waste cleaning system according to one embodiment of the invention. As shown, the body waste cleaning system is mounted to a wall.

The body waste cleaning system 100 may be mounted to a wall or similar flat surface (FIG. 4). The rear sidewall of the cleaning system housing 116 can be secured to the wall by one or more fastening elements, such as screws, nails, bolts, rivets, and the like. For example, the body waste cleaning system 100 can be mounted on a wall of a bathroom, adjacent to one or more toilets.

The body waste cleaning system 100 may be powered by any appropriate power source, such as one or more lithium or similar batteries, an alternating current (AC) source, or a direct current (DC) source. In one embodiment, the at least one controller 102 may be configured to manage the power usage of the cleaning system. For example, the controller 102 may reduce the frequency at which the fluid substance 104F is dispensed, the light source 110 is activated and/or the blowing device 112 is activated, if and when the battery charge gets below a certain threshold, such as 10 or 20 percent.

Figure 5:
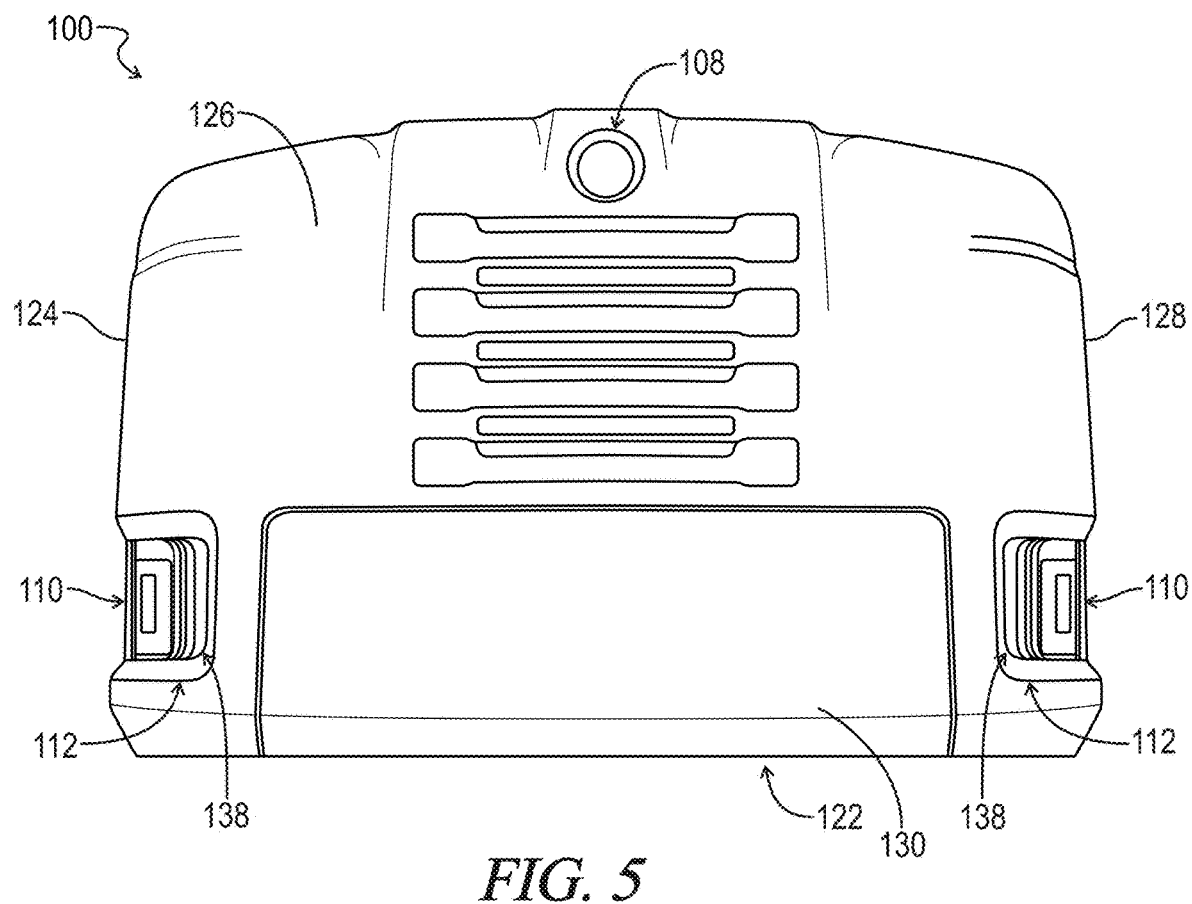
FIG. 5 is a front perspective view of the body waste cleaning system of FIG. 4.
Figure 6:
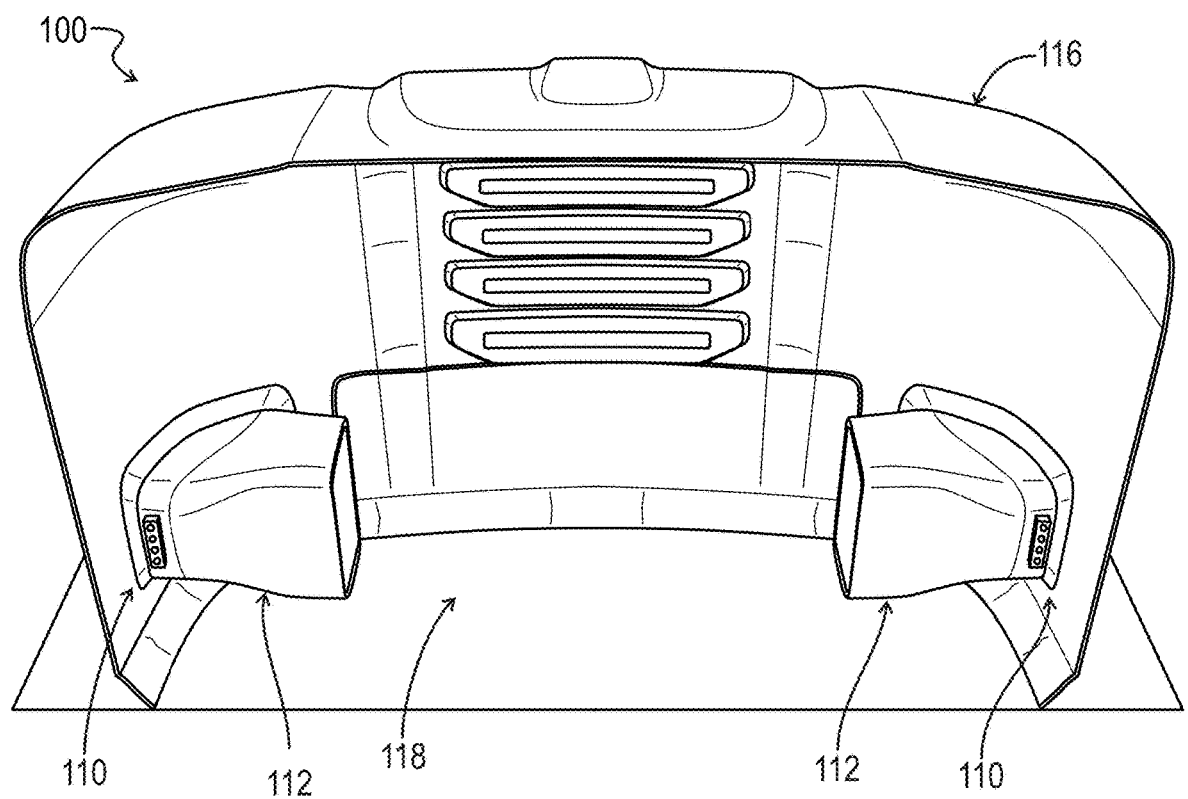
FIG. 6 is a rear view of the body waste cleaning system of FIG. 4.
Figure 7:
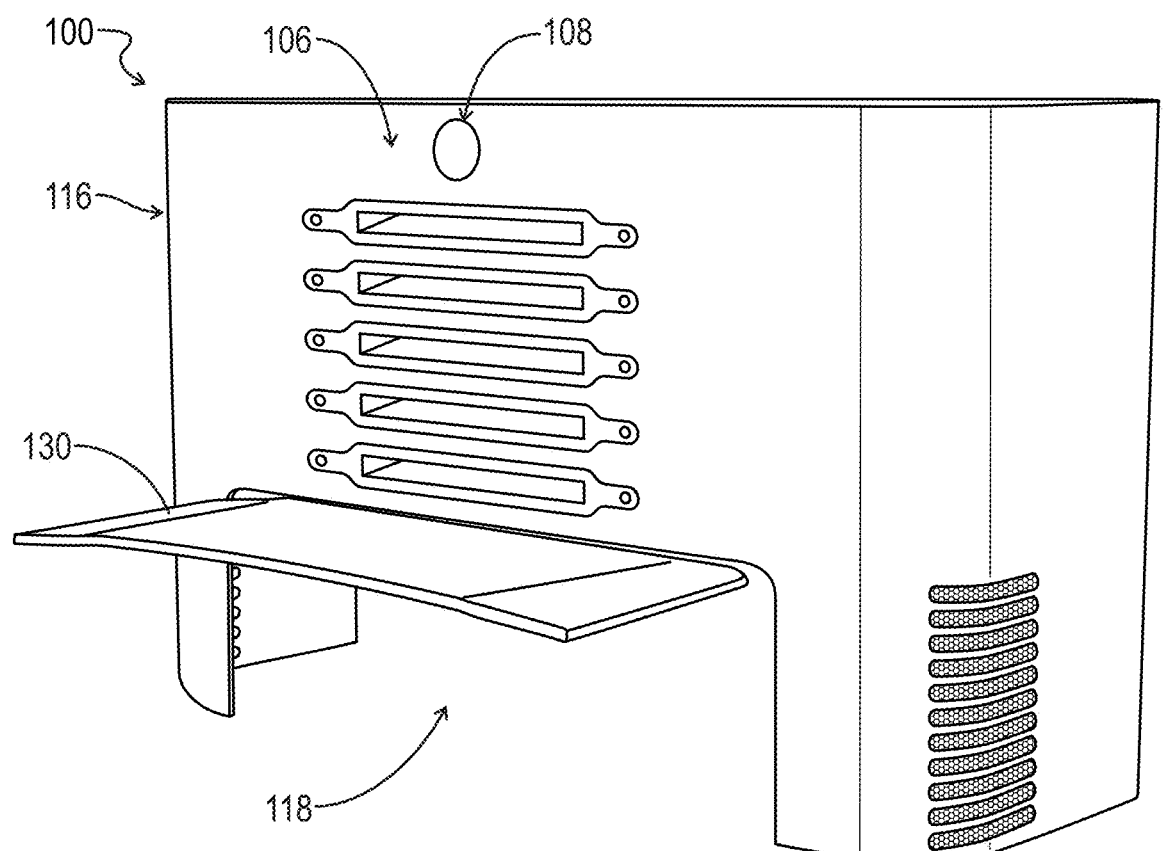
FIG. 7 is a perspective view of an exemplary embodiment of a body waste cleaning system with a service flap in the open position.
Figure 8:
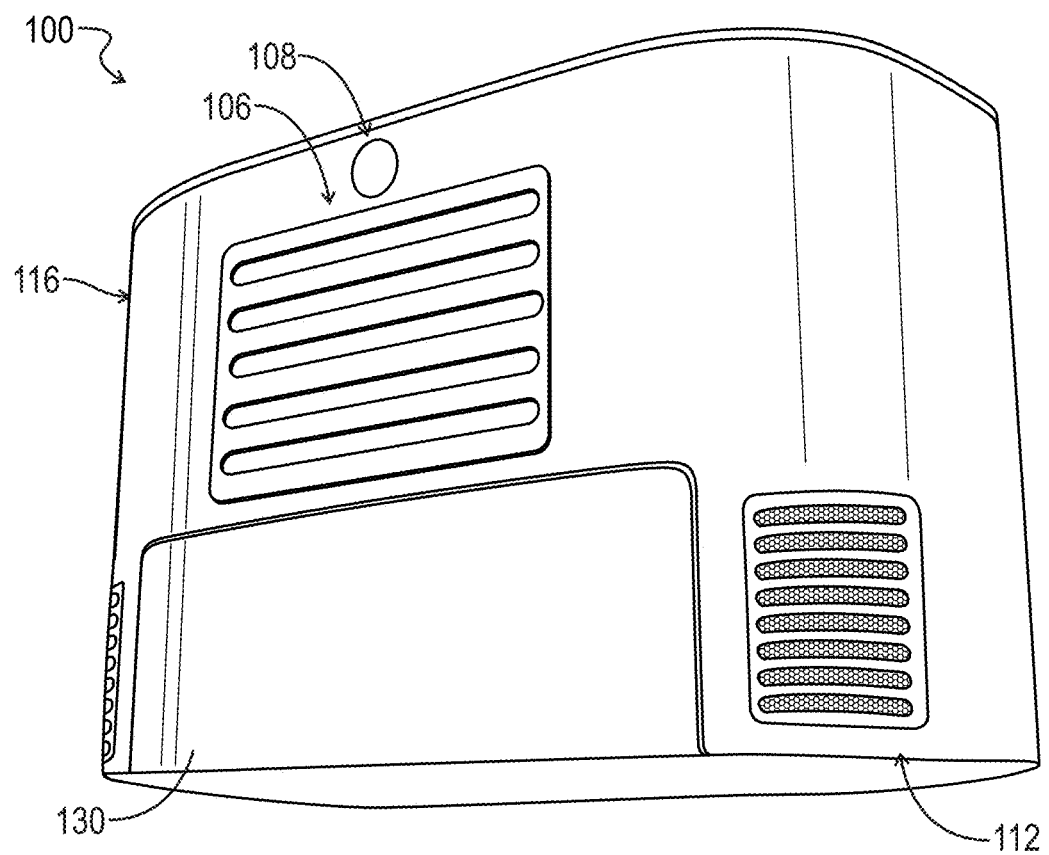
FIG. 8 is a front perspective view of another exemplary embodiment of a body waste cleaning system, which may not include a light source.

In one embodiment, the controller 102, storage reservoir 104, dispensing mechanism 106, or any other component of the body waste cleaning system 100 may be at least partially contained within the housing 116. In one embodiment, the housing 116 may comprise an interior portion 118, a top portion 120, a bottom portion 122, and at least three sidewalls 124, 126, 128 (FIGS. 4-6). By way of example and not limitation, the housing 116 may be comprised of stainless steel, plastic, ceramic, or any similar sturdy material. In one embodiment, the housing 116 may comprise four generally vertical sidewalls with a rectangular cross section as well as a generally horizontal rectangular top portion and a generally horizontal rectangular bottom portion. In one embodiment, the housing 116 may comprise rounded or curved edges.

In one embodiment, the housing 116 of the body waste cleaning system 100 may comprise at least one service flap 130 that may be movable between an open position (FIG. 7) and a closed position. When in the open position, the service flap 130 may allow a user to access the interior portion 118 of the housing 116 in order to perform maintenance or repair procedures, refill the fluid substance in the storage reservoir 104, adjust various settings the controller 102 has for the sensing device 108, use the controller 102 to program or disarm the timer mechanism 114, or engage in similar tasks. By way of example and not limitation, the service flap 130 may be movably attached to the housing 116 with protrusions on opposing distal ends being movably received within corresponding apertures within the housing 116, thereby allowing the service flap 130 to flip up or down. The service flap 130 may pivot using one or more hinge mechanisms that attach it to the housing 116; or, the service flap 130 may be completely removable from the housing 116 and may be removably snapped into place with interlocking corresponding notches and crevices integrated with the cleaning system housing 116 and service flap 130 structure. In one embodiment, the service flap 130 may be secured using one or more fastening elements, such as screws or bolts, which may be unsecured and resecured as needed in order to remove and secure the service flap 130, respectively.

In one embodiment, the body waste cleaning system 100 further comprises the at least one timer mechanism 114. The timer mechanism 114 may be coupled to and be directed by the at least one controller 102 (or internal to the controller 102) in order to determine an optimal time to release a portion of the fluid substance or activate the blowing device 112 or light source 110. The timer mechanism 114 may be at least partially contained within the interior portion 118 of the housing 116 or mounted to an exterior portion of the housing 116, such as one of the sidewalls or mounted to the top or bottom portion of the housing 116. In one embodiment, the timer 114 provides the controller 102 with a time such that the controller 102 can determine the optimal time as a function of the time, an amount of fluid in the storage reservoir 104 and/or the optimal time as a function of a power level of the battery and the time for activing the blowing device 112.

In one embodiment, the controller 102 may perform the functionality of the timer mechanism 114. The controller 102 may be programmable to activate the dispensing mechanism 106, light source 110, and/or blowing device 112 at certain times (such as 9:00 a.m., 5:00 p.m., etc.) or at certain time intervals (such as every 30 minutes). Certain optimal times and/or time periods may be targeted using presence sensor data in order to target high use times for the target area. Duration of activation may also be altered as a function of a power level of a battery of the system (e.g., reducing duration as battery charge declines or after battery charge reduced below a predetermined level).

The dispensing mechanism 106 is configured to dispense a portion of the fluid substance to a target area TA within a predetermined proximity zone PZ (FIG. 1). The target area TA can comprise one or more surfaces, such as a bathroom floor in front of or near a urinal, or the air above and surrounding the floor. By way of example and not limitation, the fluid substance may comprise one or more cleaners, disinfectants, sanitizers, deodorizers, air fresheners, or any combination thereof. In one embodiment, the system includes multiple dispensing mechanisms 106 (e.g., a deodorizer and a disinfectant).

The fluid substance is released and drawn from the storage reservoir 104 out through the dispensing mechanism 106 via the action of at least one pumping device 132, actuator, or similar mechanism. In one embodiment, the storage reservoir 104 is connected to the dispensing mechanism 106 by at least one section of piping or tubing (unnumbered). In one embodiment, the dispensing mechanism 106 may be directly connected to the storage reservoir 104. In one embodiment, the dispensing mechanism 106 is an aerosol dispenser, and in another embodiment, the fluid is dispensed via an electric pump system.

The dispensing mechanism 106 may release the fluid substance to the target area TA through one or more fluid apertures or slits 134 in one of the sidewalls 126 that comprise the housing 116. For example, the housing 116 may include four apertures 134 in its front wall 126.

In one embodiment, the body waste cleaning system 100 can further include at least one fluid sensor 136 for measuring the amount of fluid that is present in the storage reservoir 104 and/or dispensed via the dispensing mechanism 106. The fluid sensor 136 can be located within the storage reservoir 104. Alternatively, the fluid sensor 136 can be coupled to the dispensing mechanism 106 or fluid line. The fluid sensor 136 can monitor the fluid pressure, flow, fluid temperature, dispensed fluid, and/or fluid level within the fluid reservoir. Instead of a fluid sensor 136, the cleaning system 100 may include a pressure sensor, e.g. mechanical switch, which indicates whether the fluid reservoir is empty. As can be appreciated, the cleaning system may not include a fluid sensor 136. If so, the controller 102 can estimate the fluid level based on the number of times the fluid substance has been dispensed and the service intervals wherein fluid is added to the storage reservoir 104.

The body waste cleaning system 100 can direct the fluid to one or more differing target areas. For example, the cleaning system can include two or more dispensing mechanisms 106 with separate and fixed nozzles and/or servomotors connected to the nozzles for adjusting their spray direction. Each dispensing mechanism 106 and servomotor associated therewith can be connected to and controlled by the controller 102.

The sensing device 108 may be configured on or within one or more sidewalls of the housing 116 and/or on or within the top or bottom portion of the housing 116. The at least one sensing device 108 is coupled to the controller 102. The at least one sensing device 108 is configured to sense real time usage data associated with the individuals using the space adjacent to the cleaning system 100. The at least one sensing device 108 may also be configured to sense body waste, such as fecal matter and/or urine on the bathroom floor.

The at least one sensing device 108 can be in the form of a motion detector, occupancy detector, presence detector, and/or a waste matter detector. Each sensing device 108 can be an optical sensor, such as a camera, a visible and/or nonvisible light sensor, a radio wave sensor, an infrared sensor, an auditory sensor, an ultrasonic sensor, and/or a particulate matter sensor.

The body waste cleaning system 100 can include multiple sensors 108. For example, the body waste cleaning system 100 can include a first sensor in the form of a motion detector, e.g., infrared sensor, for detecting users and a second sensor in the form of a waste sensor, e.g., light sensor, for detecting the location(s) of waste in the target area. However, one sensing device 108 can dually detect the various users and waste matter.

Each light source 110 is connected to and at least partially housed within the housing 116. In other words, each light source 110 can be configured within or upon the housing 116. Each light source 110 is operably connected to the controller 102. The light source 110 may comprise a source of ultraviolet (UV) light, such as a UV lamp, light bulb, or light-emitting diode (LED). The light source 110 may function to at least partially sanitize the target area TA by exposing it to an amount of UV light, which is known to kill or inactivate at least some types of bacteria and viruses.

Each light source 110 can be directed toward the same and/or differing point(s) within the general target area TA. For example, the cleaning system can include two or more light sources 110 which are directed to differing points within the general target area TA. The body waste cleaning system 100 can include left and right light sources 110 that are located at the left and right sides 124, 128 of the housing 116. The left and right light sources 110 can direct light to left, right, and middle areas surrounding the toilet. Each light source 110 can also direct light onto the toilet itself. Additionally, for example, each light source 110, or the mounting harness thereof, can be connected to a respective servomotor for directing light as needed. Each light source 110 and servomotor associated therewith can be connected to and controlled by the controller 102.

Each blowing device 112 may be configured within or upon the cleaning system housing 116 and may be directed toward the same general target area TA as the dispensing mechanism 106. Each blowing device 112 is operably connected to the controller 102. The cleaning system 100 can include left and right blowing devices 112 respectively located adjacent to the left and right sides 124, 128 of the housing 116 and respective light sources 110. Each blowing device 112 may comprise a device configured to move air around, such as a fan with an air vent 138 in a portion of the cleaning system housing 116 (such as a sidewall thereof). Each blowing device 112 may function to facilitate the drying of the target area TA by removing any wet body waste (e.g., urine) and/or previously dispensed fluid substance via evaporation by exposing the target area TA to air movement.

In some embodiments, each blowing device 112 can further include a heater for blowing hot air. In some embodiments, each blowing device 112 can further include one or more filters, such as particulate matter filters and/or ionizers. It is conceivable that the blowing device(s) 112 can direct air through the apertures or vents in the left, front, and right sides 124, 126, 128 of the housing 116. In this regard, the same apertures in the housing 116 can be used to disperse the fluid substance 104F and air.

Figure 9:
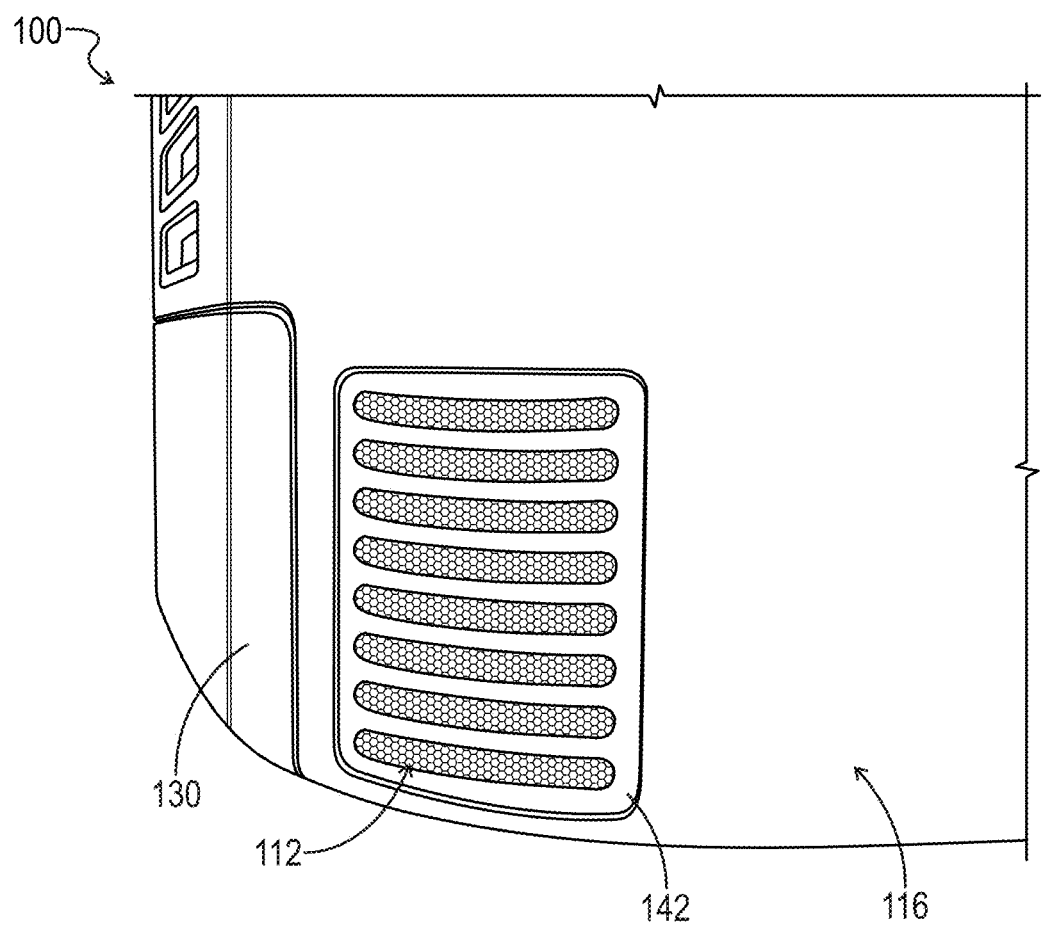
FIG. 9 is a right side perspective view of the body waste cleaning system of FIG. 8.

Each blowing device 112 can further include one or more baffles 140 for directing airflow (FIG. 4). The baffles 140 can be fixed to the housing 116. Alternatively, the baffles 140 can be connected to corresponding servomotors for directing air flow as needed. Each servomotor can be connected to and controlled by the controller 102. Each blowing device 112 can further include a guard 142, with slots or holes, and a screen (unnumbered) for dually guiding air and protecting the cleaning system 100 from foreign objects entering the housing 116 (FIG. 9).

Both the light source 110 and the blowing device 112 may be coupled to and configured to respond to commands from the at least one controller 102 based on input from the sensing device 108 in the same ways the dispensing mechanism 106 does, with the added benefit of being able to operate while a visitor is present, such as when a visitor may be using a urinal. The light source 110 and/or blowing device 112 may be configured to operate in conjunction with the dispersal of the fluid substance 104F from the dispensing mechanism 106, immediately or shortly after the fluid substance 104F has been dispersed from the dispensing mechanism 106, or independently from the dispersal of fluid substance 104F from the dispensing mechanism 106.

Figure 3:
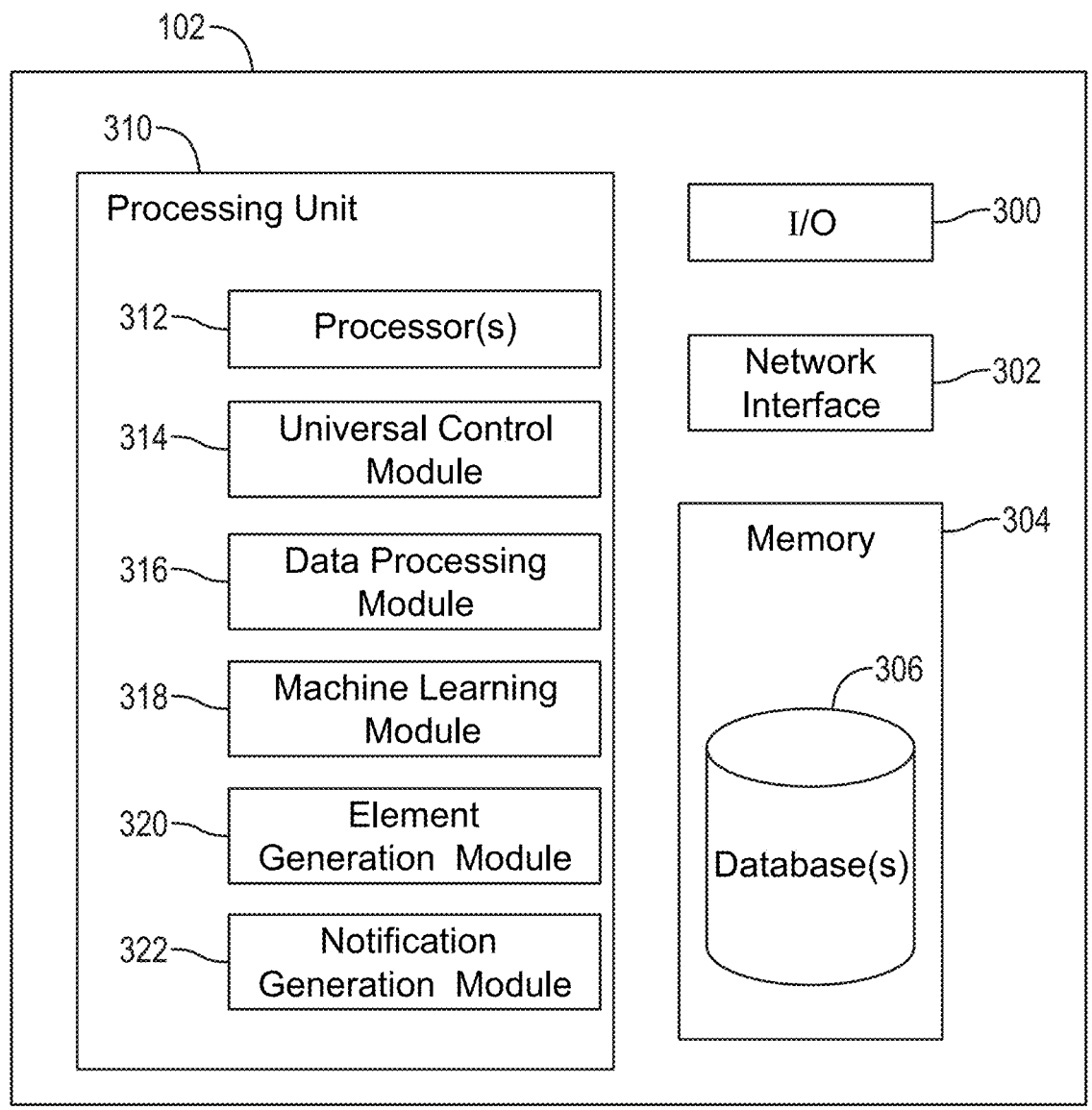
FIG. 3 is a block diagram of an exemplary controller of the body waste cleaning system.

Referring now specifically to FIG. 3, the controller 102 can include an input/output device 300, such a display screen or other mechanical interface(s), a network interface 302, a memory 304 with at least one database 306, and a processing unit 310. The processing unit 310 can generally include one or more processors 312 for performing the various operations of the body waste cleaning system 100. The processing unit 310 can also include a universal control module 314, a data processing module 316, a machine learning module 318, an element generation module 320, and a notification generation module 322. In one embodiment, the controller 102 may be at least partially contained within the interior portion 118 of the cleaning system housing 116.

The data processing module 316 can process cleaning system data pertaining to the various functionality, service intervals, statuses of the components of the cleaning system 100, or data from other cleaning systems 100 installed at the same location. The data processing module 316 can also process location data which may include information regarding the location at which is the cleaning system 100 is installed, hours of operation, a listing of events, the time and day, weather data, map data, and traffic data related to the amount of people accessing the location. The data processing module 316 can also process sensed data from the at least one sensing device 108 and the fluid sensor 136.

The machine learning module 318 can automatically generate a cleaning cycle based on sensed data in real time. The machine learning module 318 can also automatically determine an optimal cleaning location OZ based on sensed and/or estimated body waste locations in one or more body waste zones 1Z, 2Z. Furthermore, the machine learning module 318 can determine an amount of cleaning solution, an amount of light, and/or an amount and temperature of air that is provided during a given cleaning cycle. The machine learning module 318 can be trained on a training algorithm that includes toilet usage data, including average toilet usage times, time in between toilet usages by subsequent users, and information regarding users and/or certain events such as high trafficked times during an event or hours of operation of the location.

The element generation module 320 can generate cleaning cycles, modifications thereto, cleaning time and/or amount adjustments, and optimal cleaning locations based on the received data and determinations calculated by the data processing module 316 and/or machine learning module 318. The element generation module 320 can generate reports for operators or services of the body waste cleaning system 100. For example, the element generation module 320 may generate and subsequently output a maintenance summary which identifies whether any of the components need refilled, interchanged for a new component, and/or otherwise maintained. The element generation module 320 can also generate a maintenance signal upon the body waste cleaning system 100 sensing that one or more of its components need maintenance.

The notification generation module 322 may output the generated elements to the operators, maintainers, or individuals using the bathroom. The notification generation module 322 can also generate a user interface (UI), such as a display, in which the maintenance signal is overlayed, allowing the individual to easily select a cleaning cycle, a modification to a cleaning cycle, a maintenance selection, or an order for additional supplies. The notification generation module 322 can also output a maintenance signal to an indicator light on the housing 116.

Figure 12:
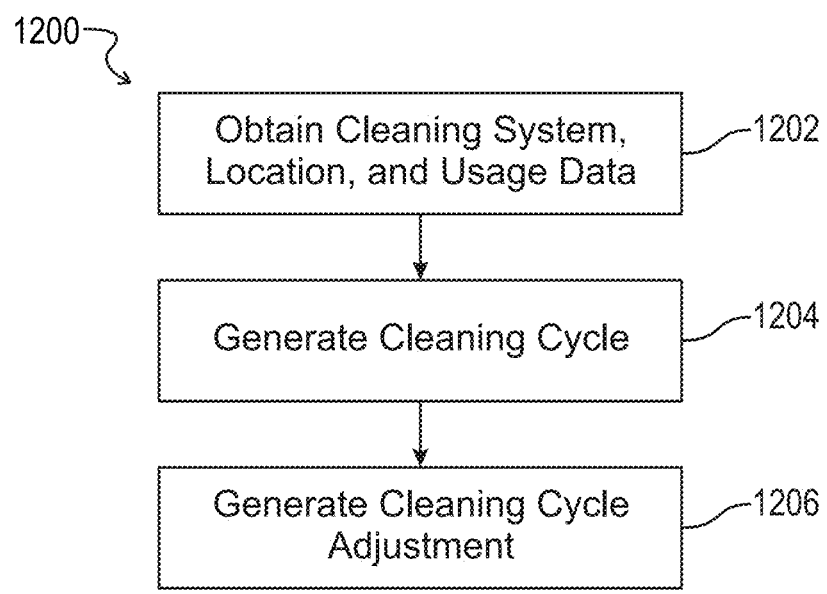
FIG. 12 is a flowchart of a method for generating a cleaning cycle.

Referring now to FIG. 12, there is shown a flowchart of a computer-implemented method 1200 for conducting an exemplary cleaning cycle to clean a location. In one embodiment, the body waste cleaning system 100 may be mounted to a wall underneath a urinal. Therein, the body waste cleaning system 100 may be used to clean the floor underneath a urinal or other toilet in a bathroom. The steps of the method 1200 can be performed by the at least one processor 312 of the controller 102.

At step 1202, the controller 102 may obtain cleaning system data, location data, and real time bathroom usage data. For instance, the controller 102 may obtain information pertaining to the various components of the body waste cleaning system 100, including the functionality and status, level, prior usage, or maintenance schedule of each component. The controller 102 may obtain information pertaining to the location, such as operating hours, a schedule of events, prior or projected number of users, and a type, number, and location of the toilet(s). The controller 102 may also obtain real time bathroom usage data from the sensor(s) 108, 136 if equipped.

At step 1204, the controller 102 may generate a cleaning cycle based on cleaning system data, location data, a generated virtual map as discussed below, usage data, and real time user data, including actual or estimated user location, user status, and status duration. The controller 102 can determine which cleaning function(s) to use, when to use them, the duration of use, and/or where to use them within the targeted area. In use, each action performed by the body waste cleaning system 100 may be regarded as a type of cleaning function (i.e., dispersing fluid substance, emitting UV light, blowing air, etc.). One or more cleaning functions may be grouped together and managed by the controller 102 in order to establish a variety of cleaning cycles.

At step 1206, the controller 102 may generate a cleaning cycle adjustment based on sensed user cleaning system data and user data. Therein, the controller 102 can adjust the previously generated cleaning cycle as needed and in real time. The cleaning cycle adjustment can optimize energy usage, fluid substance usage, and user enjoyment. For instance, the cleaning cycle adjustment may delay or prevent certain cleaning functions based on a predetermined power limit, a fluid substance level, a maintenance indicator, and/or a position of the present or subsequent user (as to not disturb the user whilst in the vicinity of the toilet). The following paragraphs outline non-limiting examples of cleaning cycles and adjustments thereof.

By way of example only, the controller 102 can determine that the user is presently using the toilet, and turn on the UV light. In so doing, any urine splattering on the floor will be treated by the UV light. Thereafter, the controller 102 can determine that the user is leaving the toilet, and then dispense the fluid substance 104F. After a predetermined time, the controller 102 may then turn on the blowing device 112 for drying the dispensed fluid substance 104F.

Additionally, for example, when the at least one sensor 108 detects a visitor is at the toilet, the controller 102 may direct the body waste cleaning system 100 to respond in a variety of ways, including by refraining from releasing any fluid substance 104F while the visitor is at the urinal, releasing a portion of the fluid substance 104F within an amount of time after the visitor leaves the urinal (such as a few seconds or minutes), releasing a portion of the fluid substance 140F after a certain number of visitors have used the urinal (such as after every fifth visitor), or any similar response configurations. Alternatively, determining user location and status may be made spontaneously, at certain times or time intervals, or after a certain number of visitors have been detected to have been previously present.

In one embodiment, the controller 102 manages and extends the life of the fluid substance 104F by running cleaning cycles (i.e., dispensing of the fluid) at predetermined minimum intervals. That is, even though the presence sensor 108 may indicate that a cleaning cycle should begin, the controller 102 limits the cleaning cycles per hour. For instance, the controller 102 can obtain cleaning system information from the fluid sensor 136 which indicates that the fluid substance 104F is beneath a certain threshold, and subsequently may adjust the cleaning cycle to conserve the fluid substance 104F until a maintenance order has been scheduled or the fluid substance 104F has been refilled.

In one embodiment, the body waste cleaning system 100 has different types of cleaning cycles such as dry only, UV only, and a fully cleaning cycle including UV, disinfectant, and drying. For example, because many restrooms have periods of very heavy use followed by inactivity (e.g., sports stadiums and movie theaters), the controller 102 may only allow a full or complete cleaning cycle after a period of inactivity as indicated by the sensing device 108 (e.g., a minimum of 5 minutes since the last user). The controller 102 may indicate a drying cycle after every user. In one embodiment, the controller 102 has a minimum of 4 hours between full cleaning cycles (unlimited if the presence of a user is not detected by the sensing device 108) in order to conserve disinfectant. However, the controller 102 may have a much lower minimum of 30 minutes between UV and/or drying cycles when the sensing device 108 determines periods of sporadic usage by multiple users.

In one embodiment, the controller 102 determines a cleaning cycle is to be run after each user is detected by the sensing device 108 and then determines whether the cycle is a UV only cycle or a full cleaning cycle based on the elapsed time since the last full cleaning cycle. In one embodiment, the controller 102 determines to initiate a drying cycle after each user as determined by the sensing device 108, but delays the initiation of the drying cycle until a preset time between users is determined (e.g., 2 minutes).

If the controller 102 determines that no visitor is present, the cleaning cycle may proceed with the controller 102 causing the pumping device 132 or actuator to engage, thereby drawing a portion of the fluid substance 104F from the storage reservoir 104 out through the dispensing mechanism 106 and into or on to the target area TA (e.g., the bathroom floor in front of the urinal). The cleaning cycle may stop there, or it may proceed with the controller 102 engaging and initiating the activation of the blowing device 112. The controller 102 may activate the blowing device 112 immediately after dispensing the fluid substance 104F, shortly after dispensing the fluid substance 104F (e.g., 30 seconds, 10 minutes, etc.), or when the controller 102 determines that a visitor is approaching or is present. The blowing device 112 thereby serves to dry any fluid substance 104F that has not yet evaporated on its own.

In another non-limiting exemplary cleaning cycle, there may be no dispensing of any fluid substance 104F. This may occur when the programmed controller settings dictate that a cleaning cycle is needed but the controller 102 determines that a visitor is present or approaching, when the controller 102 determines that there is a low amount of fluid substance 104F in the storage reservoir 104 or that the storage reservoir 104 is empty, or that the amount of time or detected visitor presences since the previous cleaning cycle does not yet warrant the dispersal of any fluid substance. In this scenario, the controller 102 may immediately activate the blowing device 112 to dry any liquid waste, such as urine, that may have accumulated at the target area TA. This may occur with or without the activation of the light source 110, depending on the programmed controller 102 settings.

In one embodiment, a cleaning cycle may comprise only the activation of the light source 110 by the controller 102 to at least partially sanitize the target area TA. Depending how the controller 102 settings are programmed, this may occur spontaneously, at certain times or time intervals, or after a certain number of detected visitor presences. The light source 110 may be activated by the controller 102 at any time(s) during the cleaning cycle, during the entire cleaning cycle, or not at all, depending on how the controller 102 settings are programmed.

Figure 13:
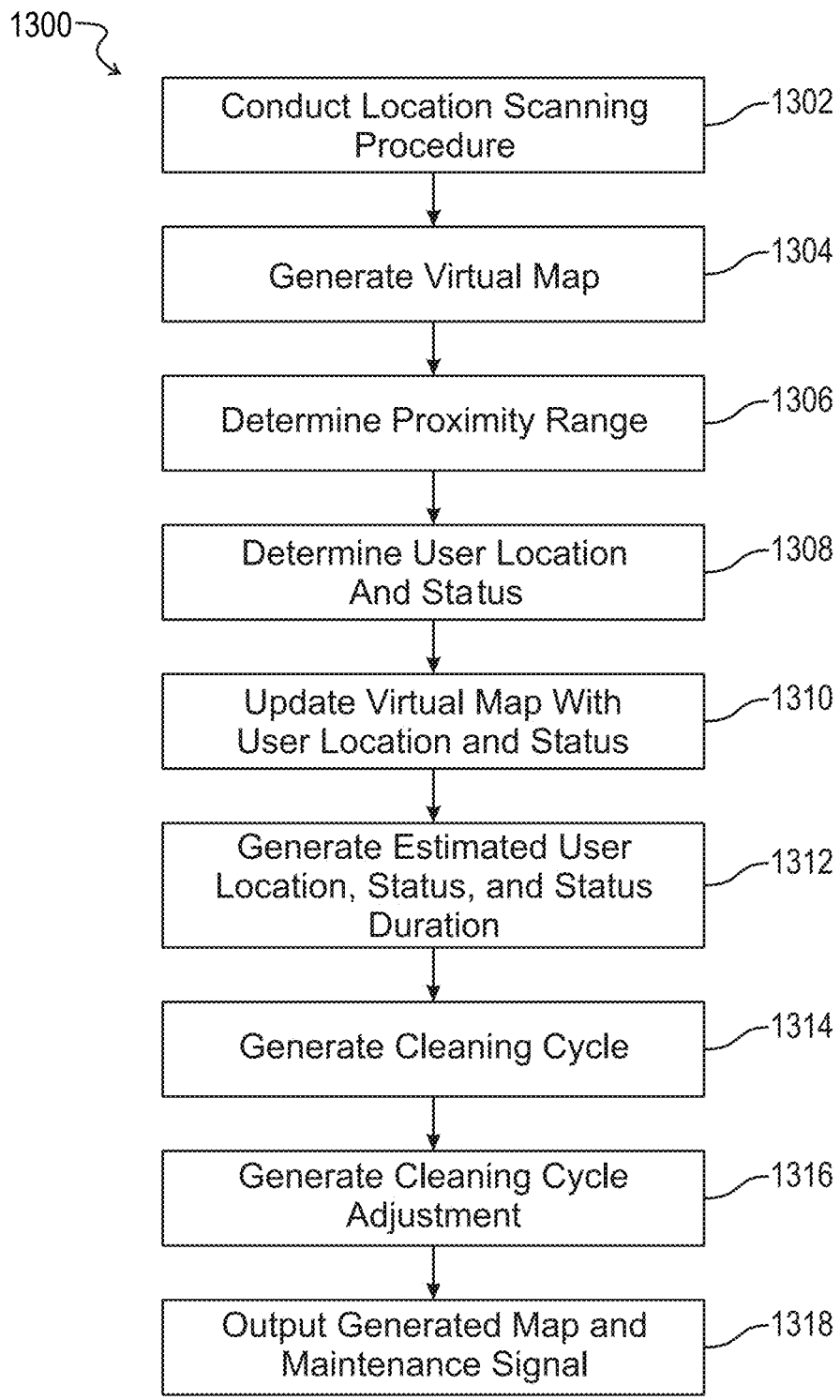
FIG. 13 is a flowchart of a method for mapping a location and generating a corresponding cleaning cycle.

Referring now to FIG. 13, there is shown a flowchart of a computer-implemented method 1300 for mapping and conducting another exemplary cleaning cycle to clean a location. As discussed above, the controller 102 may initially obtain cleaning system, location, and usage data.

At step 1302, the controller 102 may conduct a location scanning procedure. In conducting the location scanning procedure, the controller 102 may scan the location to identify its confines, various secondary structures, e.g., stalls, sinks, floor drains, etc., type of floor, and the exact location and bounds of the toilet(s). More particularly, after installation of the body waste cleaning system 100, the controller 102 may prompt the at least one sensor 108 to gather optical data. The controller 102 may also receive data from another sensor associated with the location, such as a door sensor which registers when a bathroom door is opened.

At step 1304, the controller 102 may generate a virtual map corresponding to the real world location. The data processing module and/or machine learning module 318 may generate a virtual map of the location based upon the cleaning system data, the inputted location data, and the sensed optical data from the at least one sensor 108. If the location is equipped with multiple body waste cleaning systems 100, then the controller 102 may combine the collected data to generate an omnibus virtual map of the entire bathroom or grouping of bathrooms in a building. Therein, the controller 102 may initially and automatically determine the exact location(s) and type(s) of the toilet(s) which are adjacent to the body waste cleaning system(s) 100, based at least in part upon the sensed optical data from the at least one sensor 108.

At step 1306, the controller 102 may determine a proximity range PZ associated with one or more toilets. The controller 102 may determine the proximity range PZ based in part upon the location data, the sensed optical data, and/or the generated virtual map. The proximity range PZ may be the target area TA which is actively cleaned by the body waste cleaning system 100. Alternatively, the proximity range PZ may define an area that is larger than the target area TA. The proximity range PZ can be an area from the absolute sensory range or limit of the at least one sensor 108 (or stall or bounds of the location or other secondary structures) to the outer perimeter of the housing 116, the surface to which the housing 116 is attached, or the outer perimeter the toilet(s). A proximity range PZ may correspond to one or more toilets.

At step 1308, the controller 102 may determine the location and status of the user. The controller 102 can initially sense whether or not the user has entered the proximity range PZ. If a user is detected within the proximity range PZ, then the controller 102 may identify the user's exact location within the proximity range PZ. Thereafter, the controller 102 may determine the status of the user by monitoring the subsequent movement of the user to determine whether the individual is approaching the toilet, presently using the toilet, or moving away from the toilet. Determining user location and status may be contingent upon a proximity signal from the at least one sensor 108, indicative of a user entering the proximity range PZ. Hence, the controller 102 can conserver power usage by only calculating user location and status if prompted by the at least one sensor 108.

At step 1310, the controller 102 may update the virtual map with the location and status of the user. For example, the element generation module 320 can generate an icon which corresponds to the user. The controller 102 can then position the icon of the user at the appropriate location within the proximity range PZ.

At step 1312, the controller 102 may generate an estimated user location, user status, and status duration. For example, the machine learning module 318 may determine an estimated user location, status, and status duration based in part upon the location data, the type of toilet, the secondary structures, the generated virtual map, and/or sensed user characteristics, e.g., walking speed, gate, a size or weight of the user, feet orientation such as shoes pointing towards or away from the toilet, facial features, biological sex, etc. The user characteristics can be sensed by the at least one sensor 108. Additionally or alternatively, the user characteristics can be sensed by another sensor, such as a sensor of the device of the user, which is in communication with the controller 102. For example, the machine learning module 318 may initially determine that the user has entered the proximity range PZ in an approaching state; and thereafter, the machine learning module 318 may estimate an approaching time based on the walking speed of the user. Thereafter, the machine learning module 318 may estimate a subsequent status and duration thereof, such as an estimated urination or defecation status and an estimated time thereof based in part upon the training algorithm, prior usage data, and user characteristics.

The machine learning algorithm may also determine multiple estimated statuses. The machine learning algorithm can generate a first estimated status and subsequently generate a second estimated status based upon sensed optical data from the at least one sensor 108. For example, the machine learning algorithm can generate an estimated urination status and subsequently adjust the estimated status to a defecation status based upon the at least one sensor 108 sensing that the user has repositioned their feet away from the toilet and/or spent a longer amount of time at the toilet than previously estimated.

At step 1314, the controller 102 can generate a cleaning cycle based at least in part upon the virtual map, proximity range PZ, the actual location of the user, the estimated location of the user, the estimated user status, the estimated status duration, and other sensed data. The controller 102 may generate any desired cleaning cycle as discussed above.

For example, the controller 102 can generate a cleaning cycle based upon an estimated user status, a particular toilet as previously determined by the controller 102, and prior usage data sensed by the controller 102 which is indicative of a common splatter at a particular zone within the targeted area TA. The cleaning cycle may include turning on and directing the UV light to the common spill zone upon identifying that the user is in a toilet using state. Then, the controller 102 may turn on the blowing device 112 at the end of the estimated status duration. The controller 102 can then turn the blowing device 112 off. When the controller 102 detects that the user is walking away from the toilet, or outside of the target area, the controller 102 may direct and dispense the fluid onto the predetermined common spill zone and a differing, detected spill zone. Thereafter, the controller 102 may turn on the blowing device 112 again to dry off the dispensed fluid.

At step 1316, the controller 102 can generate a cleaning cycle adjustment based at least in part upon the virtual map, proximity range PZ, the actual location of the user, the estimated location of the user, the estimated user status, the estimated status duration, and other sensed data. Hence, if the user decides to change course from the estimated location or status, the controller 102 can compare the estimated user location, status, or duration to the actual and calculated user location, status, or duration, and responsive thereto modify the cleaning cycle in real time.

At step 1318, the controller 102 via the notification module 322 can output the generated map and/or a maintenance signal to an operator or a facilitator of the bathroom. The generated map can include real time usage data and cleaning system data. For example, when the fluid sensor 136 indicates that the fluid in the storage reservoir 104 is below a certain threshold, the controller 102 may automatically output a maintenance signal for ordering new fluid and/or refilling the fluid in the storage container. Additionally, for example, the controller 102 can determine an estimated fluid-empty timeline based upon the hours of operation, the schedule of events, and/or a dispensing rate previously determined by the data processing module and/or the machine learning module 318. Thereafter, the controller 102 can output a corresponding maintenance signal based upon the estimated fluid-empty timeline.

Figure 14:
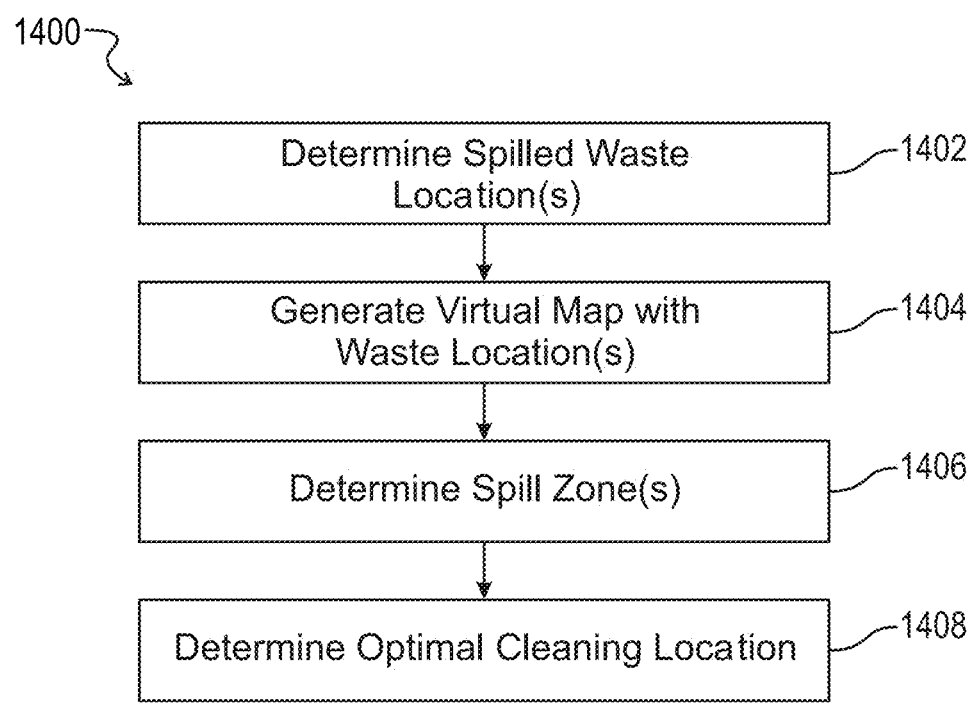
FIG. 14 is a flowchart of a method for determining an optimal cleaning location.

Referring now to FIG. 14, there is shown a flowchart of a method 1400 for automatically determining one or more optimal cleaning locations based on sensed and/or estimated body waste. Therein, the controller 102 can specifically target the cleaning procedure to a particular zone 1Z, 2Z, OZ within the target area TA.

At step 1402, the controller 102 may determine one or more locations where the user has spilled body waste. For example, the at least one sensor 108 can monitor the floor when the user is in a state of actively using the toilet. If the sensor registers a spill, then the at least one sensor 108 will output a spill signal. For instance, if the at least one sensor 108 is configured as an optical sensor, the at least one sensor 108 may register a change in reflected light at a given area which indicates that body waste is present. The at least one sensor 108 will monitor the entire target area TA and will accordingly identify the size of the spill and whether there are multiple spills.

At step 1404, the controller 102 can then receive the spill signal and accordingly generate and/or update the virtual map with the location of the spill. It should be appreciated that the controller 102 may not generate a virtual map which indicates the locations of spilled body waste.

At step 1406, the controller 102 can determine spill zones Z1, Z2 associated with the sensed spills. The spill zones Z1, Z2 can define a predetermined perimeter centered at the initial spill point, a conglomeration of spills points, and/or the largest spill at a given point. For instance, the spill zone Z1, Z2 can be a two-inch circle surrounding a particular point, in the target area TA, at which the user first spilled body waste.

The spill zones Z1, Z2 can also be determined using prior usage data or estimated spill locations. For example, the machine learning module 320 can determine that a particular location underneath a urinal is a common spill location (such as an area underneath the forwardmost end of the urinal). The determination of the common spill location can be based upon location data and/or prior spill location data from previous users. The machine learning module 318 can then determine that the common spill location should be identified as a spill zone in need of cleaning, whether or not the sensor sensed a spill at the common spill location.

At step 1408, the controller 102 can determine an optimal cleaning location OZ based on the sensed and/or estimated body waste. If only a single spill zone Z1 is identified, then the controller 102 may determine that the center of the spill zone is the optimal cleaning location at which the dispenser will be subsequently directed. If the user spills in multiple locations, then the controller 102 may initially determine whether an overlap area exists between the two or more spill zones Z1, Z2. Thereafter, the controller 102 may identify the overlap area as the optimal cleaning location OZ. Hence, the controller 102 will direct the dispenser toward the greatest area of overlap between the two or more spill zones Z1, Z2.

After determining the optimal cleaning location OZ, the controller 102 may subsequently determine a cleaning cycle and/or adjustment thereto, as discussed above. The method 1400 can be repeated multiple times during usage of the toile by a given user. Thereafter, the method 1400 may be repeated for each subsequent user of the toilet.

In one embodiment, the body waste cleaning system 100 may further comprise at least one remote control receiver coupled to the at least one controller 102. A remote control may be used to facilitate the interaction between a user and at least one body waste cleaning system 100 without the user needing to physically interact with the cleaning system directly. Among other things, the remote control may be used to turn the cleaning system off or on; activate or deactivate the dispensing mechanism 106, light source 110, or blowing device 112; program or disarm the timer mechanism; adjust the controller 102 settings for the sensing device 108; check the amount of fluid substance within the storage reservoir 104 (by getting a reading from at least one sensor, such as a level sensor, within the reservoir and coupled to the controller 102); check the remaining battery charge for the cleaning system; or any similar task or function. In one embodiment, a single remote control may be configured to interact with multiple cleaning systems. When no remote control is used or included, any of these tasks may be performed by a user interacting with one or more buttons, knobs, dials, switches, levers, touchscreens, or similar elements, which may be physically integrated with the cleaning system or any components thereof.

Figure 2:
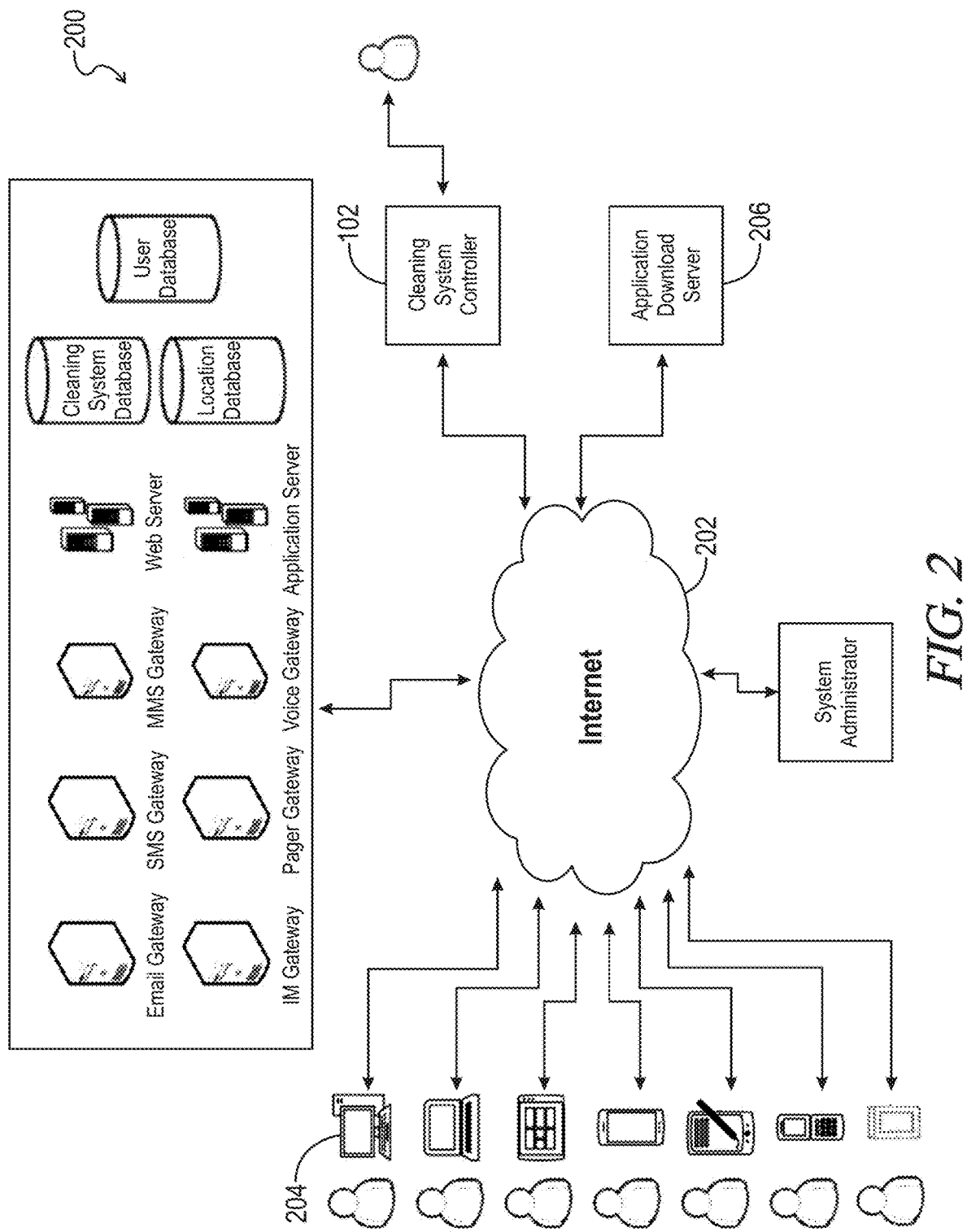
FIG. 2 is a block diagram of an exemplary system for facilitating the interaction with at least one controller of at least one body waste cleaning system, according to one embodiment of the invention.

In one embodiment, the ability to control the body waste cleaning system 100 remotely may be facilitated by a cloud-based, Internet-enabled device communication system 200 which includes a plurality of users accessing—via a user computing device and a network 202, such as the global, public Internet—an application service provider's cloud-based, Internet-enabled infrastructure (FIG. 2).

In one embodiment, a user application may be downloaded onto a user computing device 204 from an application download server 206. The application download server 206 may be a public application store service or a private download store service or link. A user computing device 204 may access the application download server via the network. In another non-limiting embodiment, the application service provider's cloud-based, communications infrastructure may be accessed via a website or web application. Multiple users may, simultaneously or at different times, access (via, for example, a user application) the infrastructure in order to facilitate their ability to interact with the controller 102 of at least one body waste cleaning system 100, engage in communication with other users, and/or to access a cleaning system database, a location database, and/or a user database via a user computing device. Users may also access the infrastructure in order to, among other things: turn the cleaning system off or on; activate or deactivate the dispensing mechanism 106, light source 110, or blowing device 112; program or disarm the timer mechanism; adjust the controller 102 settings for the sensing device 108; check the amount of fluid substance within the storage reservoir 104 (by getting a reading from at least one sensor, such as a level sensor, within the reservoir and coupled to the controller 102); check the remaining battery charge for the cleaning apparatus; monitor the usage of cleaning systems at different venues or locations; determine when a cleaning system needs service or maintenance; and the like.

In one embodiment, the user computing device 204 may be configured as: a tablet computing device or mobile computer; a mobile device; a laptop computer; a mobile or cellular telephone; a smartphone or wearable smart device (e.g., a smartwatch); a personal digital assistant (PDA); a handheld scanner; a desktop computer; a gaming console; any commercially-available intelligent communications device; or the like.

In one embodiment, the application service provider's cloud-based, communications infrastructure may include an email gateway, an SMS (Short Message Service) gateway, an MMS (Multimedia Messaging Service) gateway, an Instant Message (IM) gateway, a paging gateway, a voice gateway, one or more web servers, one or more application servers, a cleaning system database, a location database, and a user database. The application server(s) may contain computational instructions, or code, that enables the functionality of the cloud-based, Internet-enabled device communication system. The cleaning system database, the location database, and/or the user database may not necessarily be contained within the application service provider's cloud-based, communications infrastructure, such as, but not limited to, the cleaning system database, the location database, and/or the user database may be supplied by a third party. As will be apparent to those skilled in the relevant art(s) after reading the description herein, the communications infrastructure may include one or more additional storage, communications, and/or processing components to facilitate communication within the device communication system, process data, store content, and the like.

The cleaning system database may be configured to store information regarding the status, usage, performance, or similar aspects of one or more body waste cleaning systems 100. Such cleaning system information may include, by way of example and not limitation, cleaning system settings (e.g., how frequently and/or when fluid substance gets dispensed, how frequently and/or when the blowing device 112 or light source 110 is activated, how performance changes when the battery charge gets below a certain threshold, etc.), cleaning system usage history (e.g., average or total amount of fluid substance dispensed over a period of time, average or total number of visitor presences detected over a period of time, battery performance data, etc.), as well as similar types of cleaning system information as may be apparent to those skilled in the relevant art(s) after reading the description herein.

The location database may be configured to store information pertaining to any location or venue at which a body waste cleaning system 100 may be used including, but not limited to, a location/venue type (e.g., stadium, park, retail store, restaurant, office, library, etc.), location/venue addresses or global positioning system (GPS) coordinates, location/venue occupancy limits, number of body waste cleaning systems 100 at the location/venue, a number and type of toilets at the location, and the like.

The user database may be configured to store information for one or more users (e.g., individuals or entities) that have administrative or managerial authority over one or more body waste cleaning systems or that may be otherwise responsible for monitoring or maintaining one or more cleaning systems. Such information may include, without limitation, user account information (e.g., user access information, user locations, user names, login credentials (including, but not limited to, passwords, usernames, passcodes, pin numbers, fingerprint scan data, retinal scan data, voice authentication data, facial recognition information, etc.), user business affiliations, etc.), user account usage history (e.g., account access frequency, adjustments made by a user to various cleaning system settings, etc.), and the like.

In alternate aspects, the cleaning system database, the location database, and the user database may comprise one or more data stores within (or remotely located from) the application service provider's cloud-based, communications infrastructure or be a memory included in (or coupled to) the web server.

The cleaning system database, the location database, and the user database may each be physically separate from one another, logically separate, or physically or logically indistinguishable from some or all other databases.

In one embodiment, a system administrator may access the application service provider's cloud-based, communications infrastructure via the Internet in order to oversee and manage the infrastructure.

As will be appreciated by those skilled in the relevant art(s) after reading the description herein, an application service provider—an individual person, business, or other entity—may allow access, on a free registration, paid subscriber, and/or pay-per-use basis, to the application service provider's cloud-based, communications infrastructure via one or more World-Wide-Web (WWW) sites on the Internet. Thus, the cloud-based, Internet-enabled device communication system is scalable.

As will also be appreciated by those skilled in the relevant art(s), in one embodiment, various screens would be generated by the web server in response to input from users over the Internet. As a nonlimiting example, the web server may comprise a typical web server running a server application at a website which sends out webpages in response to Hypertext Transfer Protocol (HTTP) or Hypertext Transfer Protocol Secured (HTTPS) requests from remote browsers on various user computing devices being used by various users. Thus, the web server is able to provide a graphical user interface (GUI) to users of the cloud-based, Internet-enabled device communication system in the form of webpages. These webpages are sent to the user's PC, laptop, mobile device, PDA, or similar device, and would result in the GUI being displayed.

As will be appreciated by those skilled in the relevant art(s) after reading the description herein, alternate aspects of the present disclosure may include providing a tool for facilitating the interaction with a controller 102 of one or more body waste cleaning systems via the user computing devices as a stand-alone system (e.g., installed on one server PC) or as an enterprise system wherein all the components of the cloud-based, Internet-enabled device communication system are connected and communicate via an inter-corporate Wide Area Network (WAN) or Local Area Network (LAN). For example, in an embodiment where the users are all personnel/employees of the same company or are all members of the same group, the present disclosure may be implemented as a stand-alone system, rather than as a web service (i.e., Application Service Provider (ASP) model utilized by various unassociated/unaffiliated users).

As will also be appreciated by those skilled in the relevant art(s) after reading the description herein, alternate aspects of the present disclosure may include providing the tools for facilitating the interaction with a controller 102 of at least one body waste cleaning system via the application service provider's cloud-based, communications infrastructure and/or the user computing devices via a browser or operating system pre-installed with an application or a browser or operating system with a separately downloaded application on such user computing devices. That is, as will also be apparent to one skilled in the relevant art(s) after reading the description herein, the application that facilitates the body waste cleaning system controller 102 interaction platform disclosed herein may be part of the "standard" browser or operating system that ships with a user computing device or may be later added to an existing browser or operating system as part of an "add-on," "plug-in," or "app store download."

In one embodiment, the cleaning system is network connected (e.g., via WiFi), and cleaning cycles are set remotely. Parameters (or profiles) for cleaning cycles can have variables adjusted including fan speeds and air nozzle directions (or motion patterns). Other adjustable parameters include cleaning fluid quantity per cleaning cycle, status indicator lights (or not), and audio notifications during cleaning cycles or during certain portions of cleaning cycles. For example, the system may produce an audible alert when dispensing cleaning fluid, but not when providing a UV cleaning light, or the system may be configured to provide the audible alert during both the dispensing of the cleaning fluid and the emission of the UV cleaning light. In one embodiment, the system includes a user interface for adjusting these parameters directly on the system.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful BODY WASTE CLEANING SYSTEM it is not intended that such references be construed as limitations upon the scope of this invention except as set forth in the following claims

What is claimed is:

1. A body waste cleaning system comprising:
   at least one controller;
   at least one storage reservoir, the at least one storage reservoir configured to contain an amount of at least one fluid substance therein;
   at least one blowing device coupled to the at least one controller, the at least one blowing device configured to expose a target area to air movement when activated by the at least one controller;
   at least one dispensing mechanism coupled to the at least one controller and connected to the at least one storage reservoir, wherein the at least one dispensing mechanism is configured to dispense a portion of the at least one fluid substance onto the target area when activated by the at least one controller;
   at least one pumping device coupled to the at least one controller, wherein the at least one pumping device is configured to move the portion of the at least one fluid substance from the at least one storage reservoir to the at least one dispensing mechanism when activated by the at least one controller; and
   a housing configured to house the at least one controller, the at least one storage reservoir, the at least one blowing device, and the at least one dispensing mechanism, wherein;
      the housing comprises at least one fluid aperture in fluid communication with the at least one dispensing mechanism such that the dispensing mechanism provides the fluid substance from the storage reservoir to the fluid aperture; and
      the housing comprises a service flap located underneath the at least one fluid aperture, the service flap configured to be movable between a closed position and an open position to allow a user to access an interior portion of the housing in order to perform maintenance, repair, and adjust the body waste cleaning system, said maintenance comprising refilling the storage reservoir.

2. The body waste cleaning system of claim 1, wherein:
   the body waste cleaning system further comprises at least one sensing device coupled to the at least one controller, wherein the at least one sensing device is configured to sense a user location or a user present in a proximity of the sensing device.

3. The body waste cleaning system of claim 1, further comprising:
   at least one ultraviolet light source coupled to the at least one controller, wherein the at least one ultraviolet light source is configured to expose the target area to ultraviolet light when activated by the at least one controller.

4. The body waste cleaning system of claim 1, further comprising:
a timer mechanism coupled to the at least one controller, the timer mechanism configured to determine:
an optimal time to release the portion of the at least one fluid substance; and
an optimal time to activate the at least one blowing device.

5. The body waste cleaning system of claim 1, wherein:
the at least one controller is configured to generate a cleaning cycle as a function of cleaning system data, location data, and usage data, wherein the cleaning cycle includes dispensing the portion of the at least one fluid substance and subsequently exposing the target area to air movement.

6. The body waste cleaning system of claim 5, wherein:
the at least one controller is configured to generate a cleaning cycle adjustment to alter the previously generated cleaning cycle; and
the cleaning cycle adjustment is configured to progressive reduce fluid usage and battery usage between during service intervals of the system, said service intervals comprising charging a battery of the system and filling a reservoir of the system.

7. The body waste cleaning system of claim 1, wherein:
the generated cleaning cycle adjustment is configured to progressive reduce fluid usage and battery usage between during service intervals of the system, said service intervals comprising charging a battery of the system and filling a reservoir of the system.

8. The body waste cleaning system of claim 1, further comprising:
at least one ultraviolet light source coupled to the at least one controller, wherein the at least one ultraviolet light source is configured to expose the target area to ultraviolet light when activated by the at least one controller.

9. The body waste cleaning system of claim 8, wherein:
the cleaning cycle comprises:
dispensing the portion of the at least one fluid substance onto the target area;
exposing the target area to ultraviolet light; and
exposing the target area to air movement.

10. A body waste cleaning system comprising:
at least one controller;
at least one storage reservoir, the at least one storage reservoir configured to contain an amount of at least one fluid substance therein;
at least one blowing device coupled to the at least one controller, the at least one blowing device configured to expose a target area to air movement when activated by the at least one controller;
at least one sensing device coupled to the at least one controller, the at least one sensing device configured to sense a user location and a body waste location spilled by a user; and
at least one dispensing mechanism coupled to the at least one controller and connected to the at least one storage reservoir, the at least one dispensing mechanism is configured to dispense a portion of the at least one fluid substance onto the target area when activated by the at least one controller,
wherein the at least one controller is configured to:
obtain cleaning system data, location data, and usage data;
generate a cleaning cycle based at least in part upon the cleaning system data, the location data, the usage data, the user location, and the body waste location; and
generate a cleaning cycle adjustment to alter the cleaning cycle based at least in part upon the user location;
at least one pumping device coupled to the at least one controller, wherein the at least one pumping device is configured to move the portion of the at least one fluid substance from the at least one storage reservoir to the at least one dispensing mechanism when activated by the at least one controller; and
a housing configured to house the at least one controller, the at least one storage reservoir, the at least one blowing device, and the at least one dispensing mechanism, wherein;
the housing comprises at least one fluid aperture in fluid communication with the at least one dispensing mechanism such that the dispensing mechanism provides the fluid substance from the storage reservoir to the fluid aperture; and
the housing comprises a service flap located underneath the at least one fluid aperture, the service flap configured to be movable between a closed position and an open position to allow a user to access an interior portion of the housing in order to perform maintenance, repair, and adjust the body waste cleaning system, said maintenance comprising refilling the storage reservoir.

11. The body waste cleaning system of claim 10, wherein:
the at least one controller is further configured to:
conduct a location scanning procedure to identify a type and a location of a toilet at a location at which the body waste cleaning system is installed;
generate a virtual map corresponding to the location;
determine a location of the user and a status of the user at the sensed location of the user; and
update the virtual map with the location of the user and a status of the user.

12. The body waste cleaning system of claim 10, wherein:
the at least one controller is further configured to:
determine a proximity range;
generate an estimated user location upon the at least one sensing device detecting that the user has entered the proximity range;
generate an estimated user status indicative of whether the user is approaching a toilet, using a toilet, or moving away from a toilet; and
generate an estimated status duration.

13. The body waste cleaning system of claim 12, wherein:
the at least one controller is further configured to:
generate the cleaning cycle based at least in part upon the estimated user location, estimated user status, and estimated status duration;
compare the estimated user location to the sensed location of the user; and
generate the cleaning cycle adjustment based at least in part upon the comparison of the estimated user location and the sensed user location.

14. The body waste cleaning system of claim 10, wherein:
the at least one controller is further configured to determine:
a first spilled waste location;
a second spilled waste location;
a first spill zone associated with the first spilled waste location;

a second spill zone associated with the second spilled waste location; and an optimal cleaning location based at least in part upon an overlap between the first spill zone and a second spill zone.

* * * * *